No. 659,016. Patented Oct. 2, 1900.
A. COLLIER.
METHOD OF MAKING JEWEL SETTINGS.
(Application filed Feb. 26, 1900.)
(No Model.)
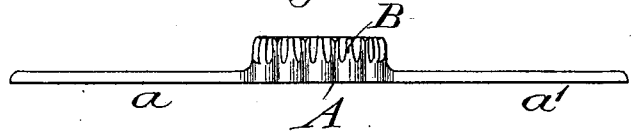
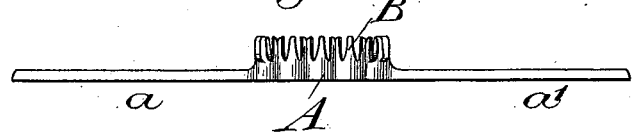
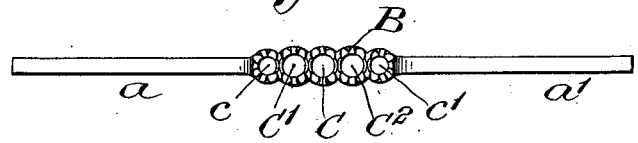
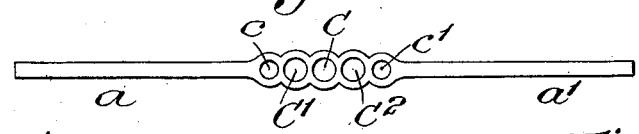
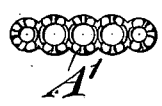
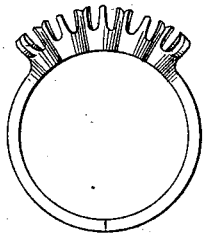
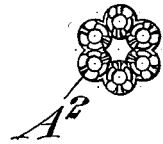
Witnesses:-
George Barry Jr.
Edward Vieser.
Inventor:-
Alfred Collier
By Brown & Seward
his Attorneys

UNITED STATES PATENT OFFICE.

ALFRED COLLIER, OF EAST ORANGE, NEW JERSEY, ASSIGNOR TO M. B. BRYANT & CO., OF NEW YORK, N. Y.

METHOD OF MAKING JEWEL-SETTINGS.

SPECIFICATION forming part of Letters Patent No. 659,016, dated October 2, 1900.

Application filed February 26, 1900. Serial No. 6,454. (No model.)

*To all whom it may concern:*

Be it known that I, ALFRED COLLIER, a citizen of the United States, and a resident of East Orange, in the county of Essex and State of New Jersey, have invented a new and useful Method of Manufacturing Settings for Jewels, of which the following is a specification.

My invention relates to a method of manufacturing settings for jewels with the object in view of providing a simple and effective way of producing articulated cramping-prongs or "cramps," as they are commonly called, integral with their base for setting gems or stones of various sizes, shapes, and qualities in such a manner as to expose their bases, as well as their sides and tops, to the light. Hitherto it has been customary to form the cramping-prongs on a separate piece of metal and subsequently weld or solder them to the base.

My present invention contemplates forging, swaging, or pressing a piece of metal into a blank which shall present a head having the cramping-prongs formed in relief on its side walls or side and end walls and subsequently removing the metal from the central portion of the head to an extent sufficient to leave the cramping-prongs articulated and projecting from the base of the head. This head, consisting of a base and the articulated prongs, may be made integral with the band of a ring or separate therefrom and may assume any shape and size, depending upon the article to which it is to be applied.

In the accompanying drawings, Figure 1 represents a view of a blank in side elevation after the metal has been forged, swaged, or pressed into shape to form the head with the cramping-prongs in relief on its exterior walls, the band of a ring being here shown integral therewith. Fig. 2 is a top plan view of the same. Fig. 3 is a side view of the blank after the metal has been removed from the head by coring it at intervals to leave the cramping-prongs articulated. Fig. 4 is a top plan view of the same. Fig. 5 is a bottom plan view. Fig. 6 is a view in side elevation, showing the blank curved into circular form to complete the ring, with the groups of cramping-prongs in position to receive the gems or stones. Fig. 7 is a top plan view of a setting independent of the band, and Fig. 8 is a top plan view of a setting of a different form.

In the form shown in Figs. 1 to 6, inclusive, the head portion of the blank is denoted by A. The arms which extend in opposite directions from the head and which are finally to be curved to form the circular ring are denoted by $a\,a'$ and the prongs formed intaglio on the side walls of the head A are denoted by B. The openings where the head has been cored out to articulate the prongs are in the present illustration five in number, the center opening C and those immediately adjacent to it, $C'\,C^2$, being similar in size and larger than the two end openings denoted by $c$ and $c'$. The number of such openings for coring out the head depends in every instance upon the number of groups of cramping-prongs to be formed or number of jewels to be set, and the size of the openings is determined by the diameter of the body of metal in the head intermediate of the group of prongs raised on its surface. It is obvious that for larger gems or stones there would be a greater space within the particular groups of cramping-prongs which receive it and for a smaller gem or stone a lesser space. The several openings are here shown as separated at their bases; but in some instances it may be found desirable to so core the metal of the head as to make the openings merge into one another, the intent being that the central body of the head intermediate of the cameo-formed cramping-prongs shall be removed so as to articulate the prongs, whether the coring for so removing the head shall produce at the base a series of independent openings or a continuous opening.

In operation the metal having been placed in proper position relative to the die and the plunger or hammer is forced into a blank—such, for example, as that shown in Fig. 1 of the drawings—a head A being raised from the piece of metal and the arms $a\,a'$ formed, which are eventually to form the circular band of the ring. The blank so formed is then subjected to a coring operation either by a set of drills for simultaneously removing the central body of the head or to one or more cutters for removing a part of the central body of the head and then to the same or a different set of cutters for removing another portion of the body of the head until the head has been cored out to an extent sufficient to leave the cramping-prongs articulated—i. e., to a point where the metal has been entirely cut away at the bottoms of the depressions between the several prongs on the blank where the prongs are formed in relief. The metal having been so removed and the prongs left articulated the arms $a\ a'$, together with the head portion A, may be subjected to a bending operation to bring the ends of the arms $a\ a'$ together to complete the ring. This bending operation will set the several groups of articulated cramping-prongs in their radial positions ready for receiving the gems or stones.

Where the setting is formed independent of the band and in the form shown at $A'$, Fig. 7, to be applied to a ring or in the form shown at $A^2$, Fig. 8, suited for a breastpin, the setting may be secured in any well-known or approved manner to a band or may have a fastening-pin attached to its base.

What I claim is—

The method of making settings for jewels consisting in first forming the cramping-prongs in relief on the exterior walls of a head and subsequently articulating the said cramping-prongs by removing the central body of head metal, substantially as set forth.

In testimony that I claim the foregoing as my invention I have signed my name, in presence of two witnesses, this 27th day of January, 1900.

ALFRED COLLIER.

Witnesses:
 FREDK. HAYNES,
 EDWARD VIESER.